US008093315B2

(12) United States Patent
Bell et al.

(10) Patent No.: US 8,093,315 B2
(45) Date of Patent: Jan. 10, 2012

(54) WEAR RESISTANT POLYMERS

(75) Inventors: Daniel Bell, Thomastown (AU); Phil Casey, Glen Iris (AU); Yesim Gozukara, Wheelers Hill (AU); Anita Hill, Hawthorn (AU); James Mardel, Ormond (AU); Tracey Markley, Camberwell (AU); Pavla Meakin, Croydon (AU); Chull Hee Oh, Mt. Waverley (AU); Terry Turney, Sherbrooke (AU)

(73) Assignee: Commonwealth Scientific and Industrial Research Organisation, Campbell, ACT (AU)

( * ) Notice: Subject to any disclaimer, the term of this patent is extended or adjusted under 35 U.S.C. 154(b) by 1360 days.

(21) Appl. No.: 10/575,402

(22) PCT Filed: Oct. 10, 2003

(86) PCT No.: PCT/AU03/01336
§ 371 (c)(1),
(2), (4) Date: Feb. 20, 2007

(87) PCT Pub. No.: WO2005/035642
PCT Pub. Date: Apr. 21, 2005

(65) Prior Publication Data
US 2007/0155885 A1    Jul. 5, 2007

(51) Int. Cl.
C08K 3/20    (2006.01)
C08K 3/14    (2006.01)
C08K 3/22    (2006.01)
C08K 3/30    (2006.01)
C08K 3/34    (2006.01)
C08K 3/36    (2006.01)

(52) U.S. Cl. .............................. 524/80; 524/430; 525/50
(58) Field of Classification Search .................. 524/80, 524/430; 525/50
See application file for complete search history.

(56) References Cited

U.S. PATENT DOCUMENTS

| 4,471,009 A * | 9/1984 | Phillips ........................ 427/386 |
| 4,877,819 A * | 10/1989 | Kiyohara et al. ............. 523/200 |
| 5,006,589 A * | 4/1991 | Sakamoto et al. ............ 524/430 |
| 5,132,356 A * | 7/1992 | Siddiqui ........................ 524/493 |
| 5,318,833 A * | 6/1994 | Fujimoto et al. ........... 428/304.4 |
| 6,046,267 A * | 4/2000 | Vidaurre et al. ............. 524/494 |
| 6,203,906 B1 | 3/2001 | Christie et al. |
| 6,399,689 B1 * | 6/2002 | Scarlette ........................ 524/430 |
| 6,469,086 B1 | 10/2002 | Neu et al. |
| 6,849,325 B2 * | 2/2005 | Murschall et al. ........... 428/212 |
| 6,890,644 B2 | 5/2005 | Kayanoki |
| 7,297,375 B2 * | 11/2007 | Wegner et al. ................ 427/553 |
| 2003/0139512 A1 | 7/2003 | Wegner et al. |

FOREIGN PATENT DOCUMENTS

| EP | 0 292 120 A2 | 4/1988 |
| EP | 0 292 120 B1 | 11/1988 |
| EP | 0 345 644 A2 | 6/1989 |
| EP | 0 345 644 B1 | 12/1989 |
| EP | 0 486 225 A2 | 11/1991 |
| EP | 0 506 033 A1 | 3/1992 |
| EP | 0 486 225 A2 | 5/1992 |
| EP | 0 506 033 A1 | 9/1992 |
| EP | 1 125 969 A1 | 2/2001 |
| EP | 1 125 969 A1 | 8/2001 |
| JP | 02-212545 | 8/1990 |
| JP | 2000-238080 | 11/2000 |
| JP | 2002-003729 | 1/2002 |
| JP | 2002-265778 | 9/2002 |
| JP | 2003-243342 | 8/2003 |
| WO | WO 00/52105 | 9/2000 |
| WO | WO 01/57142 A2 | 8/2001 |
| WO | WO 02/02676 A1 | 1/2002 |

OTHER PUBLICATIONS

Stanley-Wood, Nayland. "Particle Size Analysis: Introduction." *Encyclopedia of Analytical Chemistry.* John Wiley & Sons, Ltd. (2000), pp. 1-37.

* cited by examiner

*Primary Examiner* — Kelechi Egwim
(74) *Attorney, Agent, or Firm* — Merchant & Gould P.C.

(57) ABSTRACT

A method of improving the wear resistance of a polymer is disclosed comprising the steps of evenly dispersing an ultrafine inorganic particulate material in the polymer at a loading rate of 0.01 to 20 wt % of the total weight of the particulate polymer composite. The mixing or dispersing is preferably carried out under sub-atmospheric pressure conditions to ensure little or no bubbles form in the mixture prior to curing.

15 Claims, 5 Drawing Sheets (a) × 1.0K
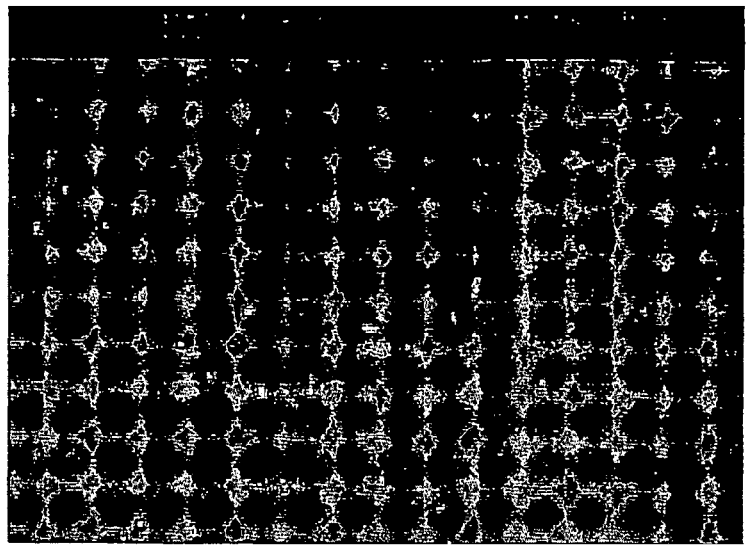
(b) × 6.0K
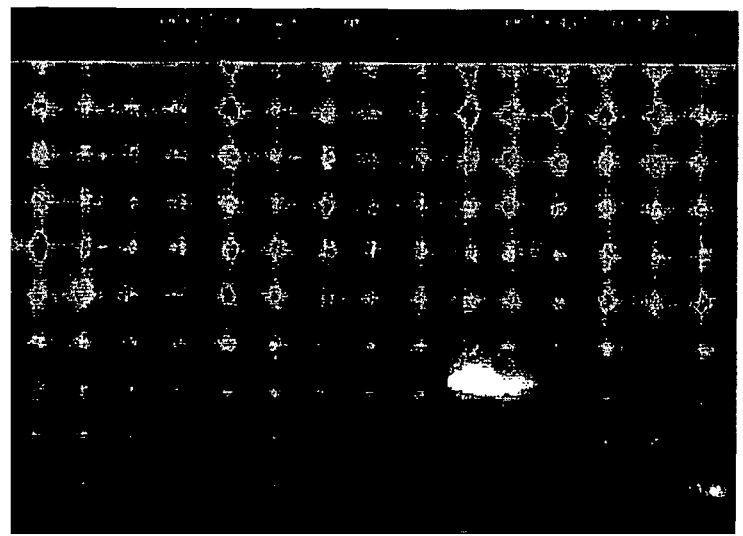
Figure 1: SEM micrograph of the surface of polyurethane containing 6.1wt% alumina prepared via the solvent method.

(a) × 1.0K
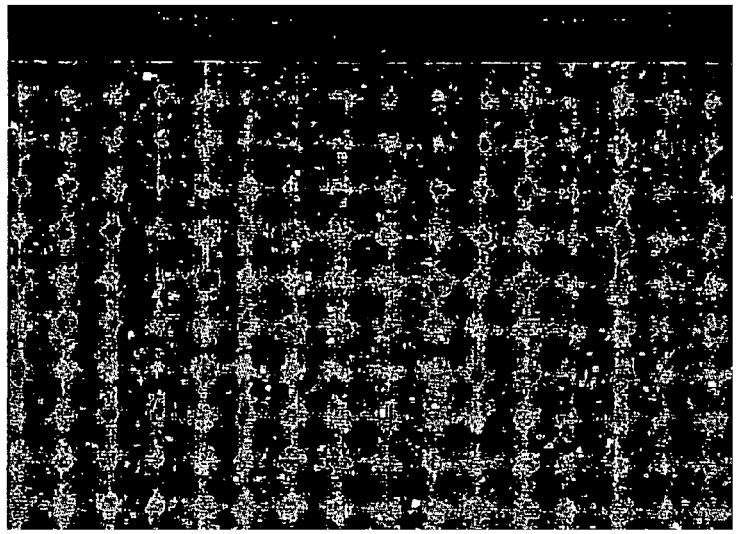
(b) × 6.0K
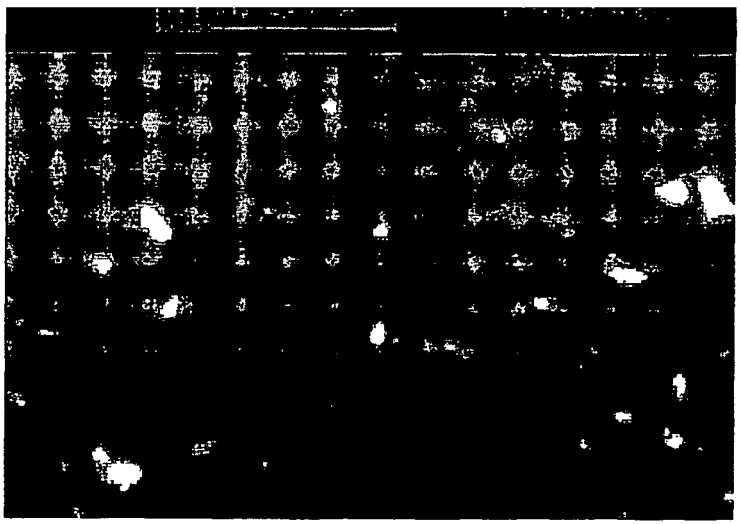
Figure 2: SEM micrograph of the surface of polyurethane containing 6.1wt% SiC prepared via the solvent method.

(a) × 1.0K
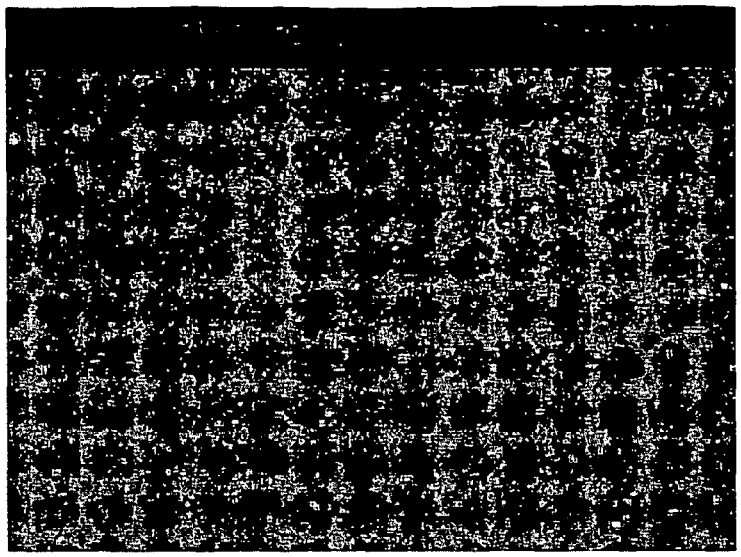
(b) × 6.0K
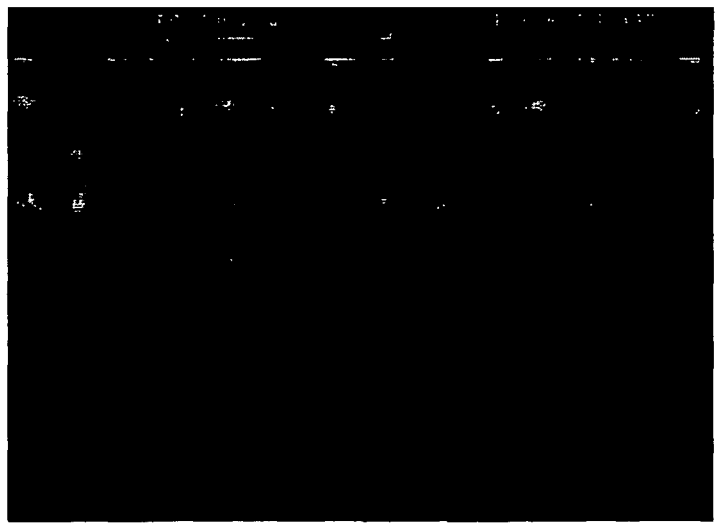
Figure 3: SEM micrograph of the surface of polyurethane containing 20.5 % SiC prepared via the solvent method.

(a) ×2.0K
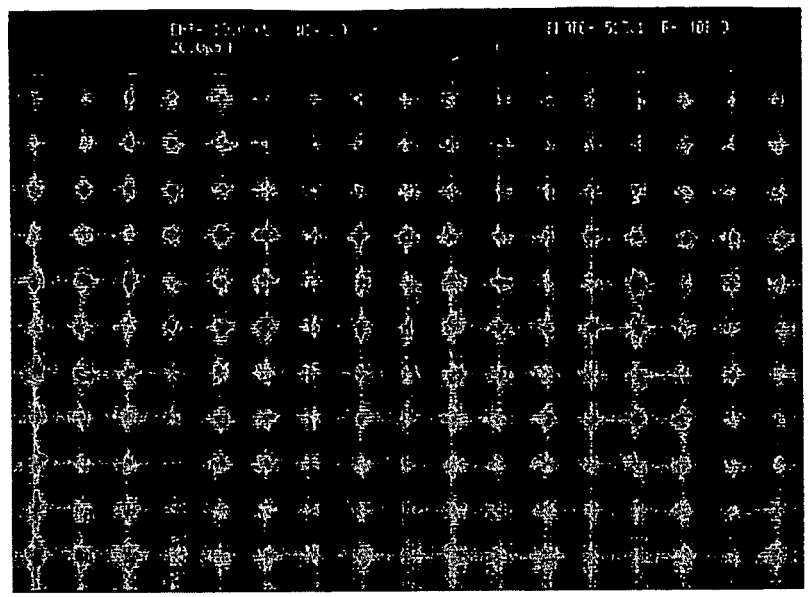
(b) × 5.0K
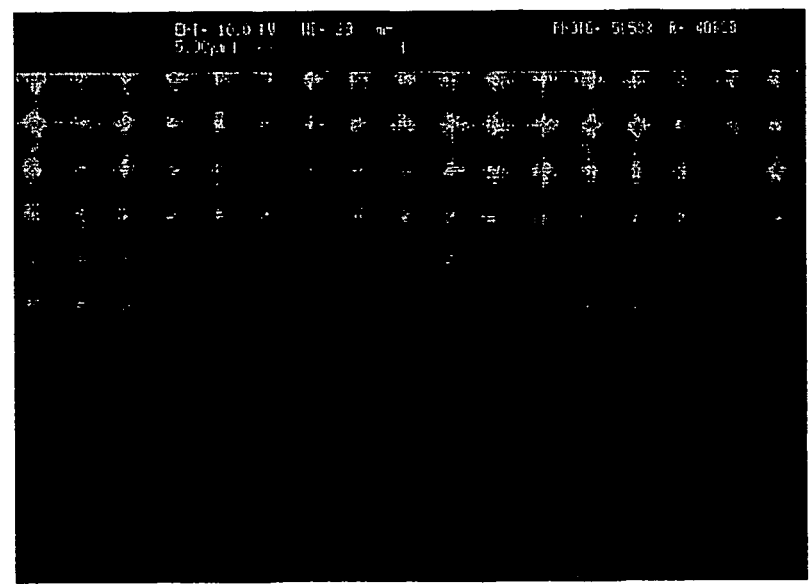
Figure 4: SEM micrograph of the surface of polyurethane containing 1.3wt% alumina prepared via the non-solvent method.

Illustration of poor dispersion:

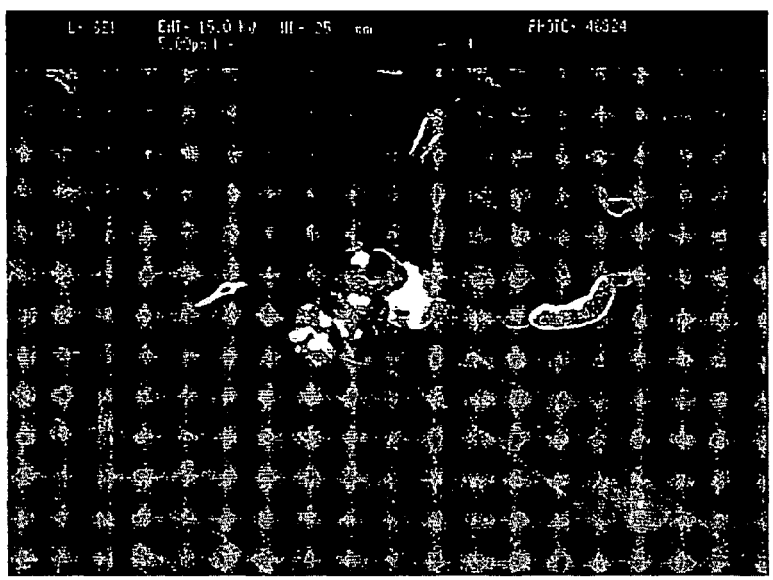

Figure 5: Secondary emission scanning electron micrograph of poorly dispersed alumina particles. In centre is an agglomerate 3μm in size composed of agglomerated 0.72 μm particles.

Figure 6: Secondary emission scanning electron micrograph of poorly dispersed alumina particles. In centre is an agglomerate 20μm in size composed of agglomerated 0.72 μm particles.

WEAR RESISTANT POLYMERS

FIELD OF THE INVENTION

This invention relates to improving the wear resistant properties of polymeric materials and in particular, polyurethane and a method of producing composite of inorganic materials with polymers.

BACKGROUND OF THE INVENTION AND PRIOR ART

While polymeric materials have replaced or reduced the use of traditional metal-based materials, the general lack of strength and wear resistance have impaired more widespread use. Even in engineering applications where the use of polymeric materials such as polyurethane provide a cost advantage, improved wear resistance would greatly improve the durability of equipment currently made from polymeric materials. In addition, improved wear resistance would expand their use into other applications.

It is to be understood that the following reference to prior art should not be taken as evidence that the references form part of the common general knowledge.

In the prior art, there are numerous examples of inorganic materials such as abrasives being added to polymers. Pat. No JP 05250666 discloses dispersing an abrasive separately to form a slurry and adding the slurry to a paint composition to obtain magnetic paint. Solvents for the dispersion of the abrasives preferably include ethers, esters, aromatic hydrocarbons, aliphatic hydrocarbons and chlorinated hydrocarbons. Binder resins for the dispersion are preferably modified vinyl chloride, polyurethane and polyester resins. Abrasives preferably include alumina, aluminum silicates, silicon carbide, chromium oxide, nitride, titanium oxide and boron oxide. The abrasive: resin ratio on dispersion is preferably 4:8. The method improves dispersability of magnetic powders and abrasives achieve high filling density and high smoothness of the surface of the medium.

Pat. No. WO 98/51736 relates to a method of producing a rigid polyurethane and/or polyisocyanurate foams by reacting a polyol with a polyisocyanurate, and adding an inorganic solid finely dispersed in a liquid phase in quantities ranging from 0.01 to 9 weight percent. The preferred inorganic additive includes $SiO_2$, $TiO_2$, $Fe_2O_3$, CdS, CdSe, tungsten carbide, silicon, silicon carbide and ferric sulfide.

U.S. Pat. No. 6,190,770 B1 describes pulsed voltage surge resistant enamelled wires that outlines a shield coating layer containing a synthetic resin, an organic solvent and α-form $Al_2O_3$ particles and γ-form $Al_2O_3$ particles. The synthetic resins can be polyacetal, polyurethane, polyester, polyesterimide, polyesterimine, polyimine, polyamideimide, polyamide, polysulfone, polyimide resins or mixtures thereof. The organic solvent used depends on the chosen resin and can be cresols, hydrocarbons, dimethyl phenol, toluene, xylene, ethylbenzene, N,N-dimethyl formamide (DMF), N-methyl-pyrrolidone (NMP), esters, ketones or mixtures thereof. The $Al_2O_3$ particles are added within a range of 3-20 wt %, with a particle size range of 0.001-10 μm, and are uniformly dispersed by high shear mixing. Optionally, a dispersant can be used to facilitate dispersion. The preferred resin are polyamideimide or polyesterimide and the solvents are a mixture of xylene, NMP and DMF or xylene, hydrocarbons, cresols and phenols, and preferred particle size for Al2O3 particles are 0.3-0.5 μm, at a loading of 5-10%.

However, thermoset polymeric precursors by their nature are relatively viscous prior to curing at lower temperatures and generally not able to sustain higher temperatures. Therefore mixing particulate inorganic materials into a polymeric resin inevitably results in the inclusion of air bubbles which seriously affect the mechanical properties of any articles produced from the polymer composite mixture. In addition, settling of heavier inorganic particulates in lighter polymer fluid results in poor dispersion and inhomogeneous properties.

It is an object of the present invention to provide a method of preparing a polymer inorganic particle composite which has improved wear resistant properties without reducing the strength properties of the polymer.

SUMMARY OF THE INVENTION

It has been found that the addition of a small amount of a particulate inorganic ultrafine and preferably submicron size material to a polymer at a loading rate less than 20 wt % based on the total weight of the polymer inorganic composite greatly increases the wear resistance properties of the polymer.

Accordingly, the invention according to one aspect, provides a polymer article comprising a polymer matrix and inorganic ultrafine particulate material characterised in that the inorganic particulate material has a particle size up to 10 μm, but preferably in the range of 1 nanometer to 1000 nanometers at a particle loading of 0.01-20 wt % based on the total weight of the polymer inorganic components, and the particles are evenly distributed through the polymer matrix.

The applicant has found that by using particles within the above range and at a loading less than the upper limit of particle loading, particulate material can be mixed into the polymer in a mixing regime which ensures no agglomeration of the particles within the polymer matrix and even dispersion of the particles throughout the polymer matrix and substantially no air or gas bubbles in the article.

As an indication of a substantially even distribution of particles in the polymer, it is preferred that the interparticle distance is less than 20 μm, more preferably less than 10 μm with the average interparticle distance being in the range of 2 μm to 10μm and more preferably 2 μm to 6 μm.

In a preferred form of the invention, the upper limit of the particle size is preferably less than 800 nanometers and more preferably in the range of 100-800 nanometers. The applicant has found that the upper limit for the particle loading is 20 wt % and preferably less than 10 wt % more preferably less than 8% and most preferably less than 6.5% based on the total weight of polymeric and inorganic material.

The applicant has surprisingly found that the additions of lower levels of submicron particulate material provides greater wear resistance in the polymer inorganic composite than higher levels above the upper limit for particle addition mentioned above. This indicates that the improved wear resistance is not reliant on the addition of a more wear resistant inorganic material to the softer polymer matrix but an interaction between the particles and polymer at the size and loading levels.

The inorganic particulate material may be any inorganic material available in submicron powder form including metal oxides, metal silicates and metal alkoxides. These include oxides, silicates and alkoxides of aluminum, titanium and silicon. Preferred materials include alumina ($Al_2O_3$), titania ($TiO_2$), zirconia ($ZrO_2$), silica ($SiO_2$), silicon carbide, hydroxides of alumina, alumina silicates such as mica and talc, and gibbsite. The inorganic particulate material in the organic-inorganic hybrid may also be formed in-situ via a sol-gel reaction using a precursor alkoxide sol such that the inorganic domains (particles) are randomly dispersed and covalently bonded in the polymer matrix.

The polymer material is preferably a thermosetting polymer. Useful thermosettable resins include e.g., polyesters and polyurethanes and hybrids and copolymers thereof including, e.g., acylated urethanes and acylated polyesters, amino resins (e.g., aminoplast resins) including, e.g., alkylated urea-formaldehyde resins, melamine-formaldehyde resin, acrylate resins including, e.g., acrylates and methacrylates, vinyl acrylates, acrylated epoxies, acrylated urethanes, acrylated polyesters, acrylated acrylics, acrylated polyethers, vinyl ethers, acrylated oils and acrylated silicones, alkyd resins such as urethane alkyd resins, polyester resins, reactive urethane resins, phenolic resins including, e.g., resole resins, novolac resins and phenol-formaldehyde resins, phenolic/latex resins, epoxy resins including, e.g., bisphenol epoxy resins, aliphatic and cycloaliphatic epoxy resins, epoxy/urethane resin, epoxy/acrylate resin and epoxy/silicone resin, isocyanate resins, isocyanurate resins, polysiloxane resins including alkylalkoxysilane resins, reactive vinyl resins and mixtures thereof.

As mentioned above, it is essential that the mixing regime for the inorganic particular material and polymer provides a substantially even dispersion of particulate in the polymer mixture and preferably avoids agglomeration of the particles and air or gas bubbles forming or being mixed into the mixture.

In accordance with another aspect of the invention, there is provided a method of forming a polymer-inorganic composite article comprising the steps of:

dispersing an inorganic submicron particulate material having a particle size up to 10 μm but preferably in the range of 1 nanometer to 1000 nanometers in a polymer at a loading rate of 0.01 to 20 wt % of the total weight of polymer and inorganic material, the dispersion step preventing the formation of gas bubbles in the mixture to provide a dispersion having a substantially even distribution of particulate material in the polymer; and casting the slurry in a mould to cure the mixture.

The mixing is carried out to minimise the amount of agglomeration and provide a substantially even distribution of particles in the polymer.

The particulate material is preferably non-aggregated particles dispersed throughout the polymer matrix and preferably the individual particles do not interact with each other. The particulate material is selected to be compatible with the polymer used and may be treated with suitable surface modifying agents to compatibilize the inorganic particles with the polymer. Surface modifying agents may be selected to render the particle relatively more polar, relatively less polar or relatively non polar. Suitable surface modifying agents include non-alcohol or non amine aromatic solvents with PGMA being preferred.

The mixing step preferably includes milling the particulate material with the polymer under vacuum conditions. The mixing can be carried out in a low shear regime typically having a $Re \leq 1000$ or a high shear regime typically having a Reynolds number much higher than 1000.

In low shear mixing, the particulate material may be coated or treated with an agent to match the hydrophobicity of the particles with the polymer. The surface of the particles is thus treated to compatibilize the chemical nature of the surface to the polymer matrix formed into a slurry with a dispersing agent.

The mixing preferably takes place under vacuum conditions and preferably in a vacuum oven to ensure no bubbles are formed in the dispersion. The vacuum oven is heated to a temperature above melting temperature and below the decomposition temperature of the polymer. In both high and low shear mixing, the vacuum under which the mixing takes place may be up to 760 mm Hg with the level dependent on the viscosity of the dispersion. Hence factors such as the temperature of the dispersion, nature of the polymer and particulate loading need to be taken into account when determining the level of vacuum required to remove all gas bubbles. After mixing, the particulate material with the polymer, the solvent is removed by evaporation (by eg distillation or oven drying) from the dispersion and the dispersion is cured to form a composite substantially free of gas bubbles.

In a high shear mixing, it is preferable that the inorganic material and polymer are loaded into a mill and the mill evacuated to sub-atmospheric pressure conditions.

Prior to loading into the mill, the inorganic particulates may be compatibilized as discussed above.

The mixture is then milled at a mill temperature, above the melting temperature resin but below the decomposition temperature of the polymer resin.

Polymerisation may then be initiated by the addition of an initiator and the dispersion cured. The initiator may be any initiate appropriate for the polymer used, and is used in a effective amount to promote polymerization of the monomers present in the composition and the amount will vary depending upon the type of initiator and the molecular weight of the initiator.

Other additives such as anti static agents, fillers, pigments, optical brighteners and UV brighteners may be added without departing from the invention. The precise nature and scope of these additives would be readily apparent to the person skilled in the art.

Preferably the polymer is a thermosetting polymer and the curing step includes the addition of an initiator and allowing the polymer to cure.

In accordance with a further aspect, there is provided a method of dispersing an inorganic particulate material substantially homogenously in a polymer, the particulate material consisting essentially of particles having a particle size up to 10 μm, but preferably between 1 nanometer and 1000 nanometers at a loading rate in the range of 0.01 to 20 wt % based on the total weight of the particulate and polymer material, the method comprising the steps of combining the particulate material and a powder of the polymer under sub-atmospheric pressure conditions, the combination being milled at a temperature above the melting temperature but below the decomposition temperature of the polymer to form a dispersion, and curing the dispersion In one form of this aspect of the invention, the particulate material is added to a solvent carrier to form a slurry prior to addition to the polymer, the solvent carrier being evaporated from the dispersion and the milling is conducted at a pressure of typically less than 900 millibar (gauge). The addition of the solvent is particularly suitable for low shear mixing regimes i.e. less than Re of 1000.

Due to the increased wear resistance properties gained from the invention there is also provided a method of increasing the wear resistance of a polymer comprising the steps of dispersing an inorganic ultrafine particulate material having a particle size up to 10 μm, but preferably in the range of 1 μm to 1000 μm in a polymer at a loading rate of 0.01 to 20 wt % of the total weight of polymer and inorganic material, the dispersion step preventing the formation of gas bubbles in the mixture to provide a dispersion having a substantially even distribution of particulate material in the polymer; and casting the dispersion in a mould to cure the polymer.

Further features, objects and advantages of the present invention become more apparent from the following description of the preferred embodiments and accompanying drawings in which:

FIG. 1 is a micrograph of a polyurethane polymer containing 6.1 wt % alumina;

FIG. 2 is a micrograph of a polyurethane polymer containing 6.1 wt % SiC;

FIG. 3 is a micrograph of a polyurethane polymer containing 20.5 wt % SiC; and

FIG. 4 is a micrograph of a polyurethane polymer containing 1.3 wt % alumina;

FIG. 5 is a micrograph of a polyurethane polymer showing an example of poorly dispersed particles; and FIG. 6 is a micrograph of a polyurethane polymer showing an example of poorly dispersed particles.

The preferred polymer is preferably a polyurethane formed from a combination of one or more diisocyanates such as:

dicyclohexylmethane diisocyanate, isophorone, diisocyanate, naphthylene diisocyanate, 4,4'-diprenylmethane diisocyanate and methylene diiscocyanate, and a substantially linear hydroxyl-terminated or amine-terminated polyol which is at least one member selected from the group consisting of polyester, polyether and polycarbonate, polysiloxane in the presence of a chain-extending agent, initiator or catalyst where at least one member is selected from the group consisting of either ethylene glycol, butanediol, hexanediol, and 1,4-di-(.beta.-hydroxyethyl)-hydroquinone or a diamine (such as MOCA [4,4'-methylenebis-(3-chloro,2,6-diethyl)-aniline], para-phenylene diamine, oxydianiline, metaphenylene dimaine, . . . ) or chain-lengthening agent further contains a triol chain-lengthening agent or a tri-amine chain-lengthening agent Most polymeric resins and in particular two pack thermosetting resins such as polyurethane are viscous liquids at the temperatures which they are ideally mixed. Due to this viscosity, addition of a solid phase material is likely to introduce gas/air bubbles into the mixture, which in the case of larger particles can be removed by application of vacuum. However, with some submicron powders removal of the gas/air bubbles is extremely difficult.

To overcome this problem, the applicant developed in one embodiment, a method of preparing a polymer composite that involves the steps of forming a slurry of a solvent with the inorganic powder to remove gas and particularly air pockets between the fine particles. The slurry is then added and mixed with the polymer resin to disperse the inorganic material. The solvent is then removed by evaporation so as not to change the intrinsic property of the polymer matrix leaving the powder dispersed within the polymer and substantially free of air/gas bubbles.

A further embodiment of the invention involves a process that disperses the inorganic material homogenously through the polymer without the use of a solvent, while avoiding the introduction of gas bubbles into the mixture. This involved an attrition milling process which improves dispersion and can be utilised to control and tailor particle size. The mixing process need not be attrition milling but should be a high shear mixing process to attain dispersion.

In both cases, the mixing is conducted under vacuum conditions at a pressure of typically less than 900 millibar (gauge) to limit as far as possible the introduction of gas bubbles into the dispersion.

EXAMPLES

The invention will be described using the following examples. It is to be understood by a person skilled in the art that these examples do not place any limitation on the present invention.

Example 1

To demonstrate the effectiveness of this method sub micron alumina having an average diameter of 0.72 µm was mixed with a solvent. As the resulting slurry was to be mixed with polyurethane, the solvent needed to be compatible with polyurethane. Therefore PGMA (Propylene Glycol Monomethyl-ether Acetate) from Orica Chemnet was used. The polyurethane material was a two-part resin consisting of the materials shown in Table 1.

TABLE 1

TWO-PART RESIN USED TO FABRICATE POLYURETHANE

| Materials | Manufacturer | Specification |
|---|---|---|
| ERAPOL E93A | Era Polymer Pty. Ltd. | Toluene diisocyanate polyester-based polyurethane |
| MOCA | Era Polymer Pty. Ltd. | Suncure, 4,4-Methylene Bis (orthochloroaniline) |

(A) The preferred processing method to fabricate the inorganic composite of polyurethane is described below:

E93A was heated in a vacuum oven at 80° C. until foaming stopped (for 16 hrs).

Alumina powder was ball-milled for 16 h with PGMA using 10 mm alumina milling media.

After milling, the slurry was placed on a vibrating table for 5 minutes to remove air bubbles from the slurry.

The slurry was then added to E93A and mixed thoroughly on a hot plate using a magnetic stirrer until all the added PGMA was removed (normally overnight).

MOCA was melted at 110° C. prior to mixing.

Mixing of the MOCA and the slurry (i.e., mixture of E93A and inorganic powders) was carried out using a magnetic stirrer to prevent the formation of air bubbles in the mixture.

The resultant mixture was poured into moulds (Teflon moulds and greased glass containers pre-heated at 100° C. overnight).

The samples were cured at 100° C. for 1 hr and then post-cured at 70° C. for 16 hrs in a vacuum oven.

Polyurethane specimens were cast in different preheated moulds to be used for different wear resistance and mechanical property tests. In particular, two types of teflon moulds were used: the first was 30×70×3 mm thick for slurry pot test, the second was 40×80×3 mm thick for tensile test. In addition, a glass container coated inside with thin vacuum grease (100 mm dia.×5-7 mm thick) was used as a mould for erosion jet and dry sand rubber wheel tests.

Scanning electron microscope (SEM) was used to examine the structure of the specimen. A micrograph of a specimen containing 6.1% alumina prepared according to the method outlined above is shown in FIG. 1. Grains of alumina (lighter colour) in the polyurethane (dark colour) were well dispersed. Bonding between inorganic powders and polyurethane also appeared to be good. No obvious micro/macro pores or other defects in the structure were found.

Example 2

The same as in Example 1 with the exception that the inorganic additive was sub micron silicon carbide powder having an average particle diameter of 0.6 μm. SEM micrograph is shown in FIG. 2. Interparticle distance ranged from 1 μm to 6 μm with an average interparticle distance of approximately 3 μm.

Example 3

The same as in Example 2 with the exception that the sub micron silicon carbide was added at a loading level of 20.7 wt %. SEM micrograph is shown in FIG. 3. Interparticle distance ranged from 0.5 μm to 5 μm with an average interparticle distance of approximately 2.3 μm.

Example 4

The same as in Example 1 with the exception that the inorganic additive sub micron alumina powder was added at a loading level of 1.3 wt %. Interparticle distance ranged from 1 μm to 10 μm with an average interparticle distance of approximately 5 μm.

Example 5

In this example the method of producing an inorganic/polymer composite without the use of solvent is outlined.

Milling media (5 mm diameter YTZ balls) were loaded into an attrition mill, followed by polymer and alumina powder having a particle size of 720 μm. The milling container was evacuated (850 millibar, 0.5 h) before commencing milling. The mixture was then milled for 2 h at 130 rpm, maintaining mill temperature below 70° C. The polymer/alumina mixture was then separated from milling media. As the mixing took place under vacuum conditions, all bubbles were removed from the polymer/inorganic material mixture and it was heated and maintained at 80° C. before polymerisation was initiated. In this example, the TDI polyurethane/alumina mixture, with alumina present at a loading of 1.3 wt % of total composition, was mixed with MOCA for 3 minutes and the resultant mixture was cast into a mould. The specimen was then cured at 100° C. for 1 h and then post-cured at 75° C. for 16 h. SEM of the microstructure of the polyurethane/alumina composite is shown in FIG. 4.

A range of mechanical tests were carried out on generated specimens to determine their wear rate and mechanical properties compared with standard unmodified materials. Testing methods carried out in compliance with ASTM methods included slurry pot (ASTM G105), jet erosion (ASTM G76), dry sand rubber wheel (ASTM G65), tensile strength (ASTM D638) and hardness measurements (ASTM D2240 00).

The results of these tests are shown in Tables 2 and 3.

TABLE 2

FOR LOW SHEAR MIXING METHOD

| Sample ID | Jet Erosion Wear Rate Normalized to Control (Control has no inorganic material) | Slurry Pot Wear Rate Normalized to Control (Control has no inorganic material) | Dry Sand Rubber Wheel Wear Rate Normalized to Control (Control has no inorganic material) |
|---|---|---|---|
| 0.6 μm SiC at 20.7 wt % |  | 1.37, 1.55 |  |
| 0.6 μm SiC at 6.1 wt % |  | 1.25, 0.79, |  |
| 0.6 μm SiC at 1.3 wt % | 0.96, 0.87 | 1.89, 1.57 | 2.22, 1.82 |
| 0.72 μm Al$_2$O$_3$ at 6.1 wt % |  | 0.99, 0.95 |  |
| 0.72 μm Al$_2$O$_3$ at 1.3 wt % | 0.55, 0.56, 0.55, 0.47, 0.48 | 0.57, 0.42, 0.83, 0.68, 0.76, 0.52, 0.85, 0.73 | 0.93, 0.57, 0.75, 0.46, 0.53 |
| 0.6 μm Al$_2$O$_3$ at 1.3 wt % |  | 0.89, 0.78 |  |
| 0.18 μm Al$_2$O$_3$ at 1.3 wt % |  | 0.59 |  |

TABLE 3

FOR HIGH SHEAR MIXING METHOD

| Sample ID | Jet Erosion Wear Rate Normalized to Control (Control has no inorganic material) |
|---|---|
| 0.72 μm Al$_2$O$_3$ at 1.3 wt % | 0.67, 0.60 |

The wear rates for the polymer containing inorganic particles is divided by the wear rate for the polymer without any particles (termed Control), such that Wear Rate Normalized to Control=(wear rate of composite)/(wear rate of control)

A value of 0.5 for the Wear Rate Normalized to Control means that the composite has one half the wear rate of the control It can be seen from the results that a small amount of submicron size particulate material added to polyurethane greatly improves the wear resistance of the original polymer. As stated previously, it is envisaged that the invention can be applied to a variety of polymers, including thermosetting and thermoplastic polymers, and a number of nanoparticle size refractory materials including metal oxides, metal silicates and metal alkoxides. Alternative processing methods such as injection moulding and extrusion could also be utilised.

FIGS. 1 to 4 are micrographs of polymer inorganic composites in accordance with the invention. It can be seen that even at loadings of 6.1 wt %, the particles are evenly distributed with little or no agglomeration. FIGS. 5 and 6 are micrographs showing poorly dispersed alumina particles with agglomerates of 3 μm and 20 μm respectively of 0.72 μm particles.

A broad loading range of particulate addition was employed to address the two possible models for improved wear resistance. These models are the formation of a physical barrier on the wear surface against an abrasive environment, which can be achieved through the use of high additive loadings, and changing the microstructure of the polymer in order to improve the wear resistance, which is achieved by the use of very low additive loadings. Addition of a small amount of ultrafine and preferably submicron particulate alumina to polyurethane provided a wear resistance greatly in excess of the original polymer.

In addition, improved water resistant properties have been observed, and it is expected that the addition of ultrafine and preferably submicron particles to polymers will greatly improve other mechanical properties such as rebound resilience, elasticity, fatigue and hysteresis.

Such composites of inorganic materials with polymers have a wide range of potential applications, including bulk solids handling and any surface where wear is a critical factor. Other improved mechanical properties may make the composites suitable for applications where hysteresis effects would be effective, such as spring dampers.

The foregoing describes the principles of the present invention, and modifications, obvious to those skilled in the art, can be made thereto without departing from the scope of the invention. All such modifications shall be deemed to be within the ambit of the above description.

The invention claimed is:

1. A method of forming a polymer-inorganic composite article comprising the steps of:
    mixing an inorganic submicron particulate material having a particle size from 1 nm up to 1000 nm in a polymer at a loading rate of 0.01 to 20 wt % of the total weight of polymer and inorganic material, the mixing step preventing the formation of gas bubbles in the mixture to provide a dispersion having a substantially even distribution of particulate material in the polymer wherein the mixing step includes milling the particulate material with the polymer under sub-atmospheric conditions;
    casting the dispersion into a mould; and
    curing the mixture.

2. The method according to claim 1, wherein the milling at subatmospheric conditions is carried out to minimize the amount of agglomeration of dispersed particles and provide a substantially even distribution of particles in the polymer.

3. The method of claim 1, wherein the mixing is carried out in a low shear regime having a Reynolds number less than or equal to 1000.

4. The method of claim 1, wherein the mixing is carried out in a high shear regime having a number much greater than 1000.

5. The method of claim 1, wherein the particulate material is coated or treated with a dispersing agent to match the hydrophobicity of the particles with the polymer.

6. The method of claim 5, wherein the dispersing or compatibilizing agent is selected from the group consisting of non-alcohol or non amine aromatic solvent.

7. The method of claim 1, wherein the mixing occurs at under vacuum conditions to ensure no bubbles are formed in the dispersion.

8. The method of claim 1, wherein the mixing occurs under a pressure of less than one atmosphere to ensure no bubbles are formed in the dispersion.

9. The method of claim 7, wherein the mixing is conducted in a vacuum oven at a temperature above melting temperature and below the decomposition temperature of the polymer.

10. The method of claim 1, wherein the mixing takes place in a vacuum up to 760 mm Hg with the level dependent on the viscosity of the dispersion.

11. The method of claim 3, wherein the particulate material is added to a solvent carrier prior to addition to the polymer to form a slurry.

12. The method of claim 11, wherein the solvent is removed by evaporation from the dispersion and the dispersion is cured to form a composite substantially free of gas bubbles.

13. The method of claim 4, wherein the inorganic particulate material is dispersed in the polymer by milling the particulate material and polymer at a mill temperature, above the melting temperature resin but below the decomposition temperature of the polymer resin at a pressure below atmospheric pressure.

14. The method of claim 1, wherein after the mixing step polymerisation is initiated by the addition of an initiator and the dispersion cured.

15. The method of claim 1, wherein at least one other additive selected from the group consisting of anti-static agents, fillers, pigments, optical brighteners and UV brighteners are added to the dispersion prior to curing.

* * * * *